Nov. 7, 1933.   C. YARVICE   1,934,158
FISH LURE
Filed May 26, 1930
Fig. 1.
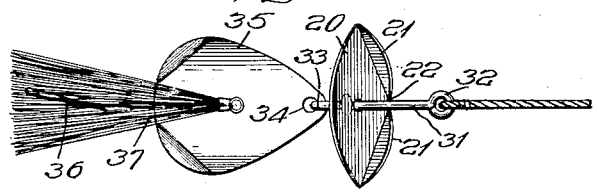
Fig. 2.
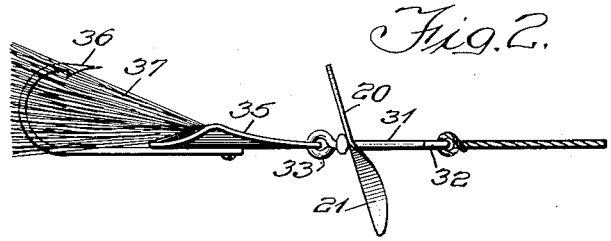
Fig. 3.
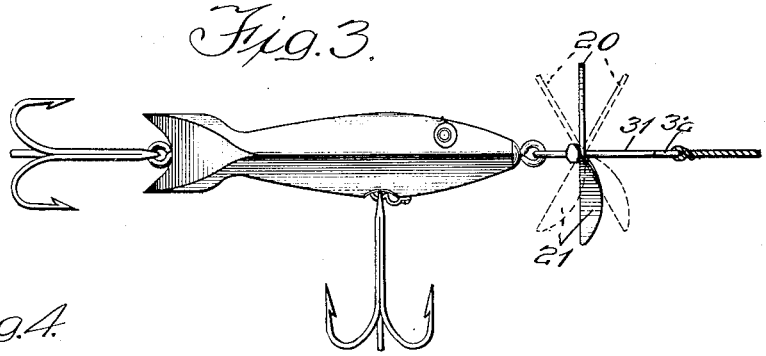
Fig. 4.
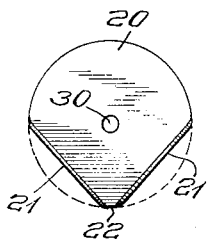
Fig. 5.
Fig. 6.
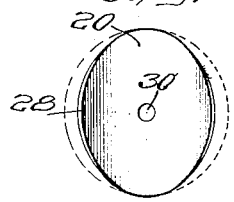
Witness:
William P. Kilroy
Inventor
Charles Yarvice
By Samuel W. Banning
Atty Patented Nov. 7, 1933

1,934,158

UNITED STATES PATENT OFFICE 1,934,158

FISH LURE

Charles Yarvice, Gary, Ind., assignor to James Heddon's Sons, Dowagiac, Mich., a corporation of Michigan Application May 26, 1930. Serial No. 455,591

4 Claims. (Cl. 43—42)

This invention relates to fish lures of a type designed to be drawn or retrieved through the water in simulation of the swimming movements of a minnow, and to dart and move in a lively manner.

The particular feature of the present lure, which is designed to impart movements, is in the form of a device which may be attached at or near the forward end (when retrieved) of a fish lure, and which is adapted to impinge against the water in such a manner as to impart darting and diving movements in various directions, combined with a vibrating or fluttering movement, more or less erratic, which not only simulates the movements of a minnow, but produces a shimmering or reflecting effect in the water, which greatly increases the attractiveness of the lure.

The resistance device of the present invention is adapted to be applied to baits of various sizes, weights, and configuration, and the invention resides in the form of the resistance device and in the manner of mounting it with respect to the bait body.

In the drawing:

Figure 1 is a plan view of a bait body having applied thereto the device of the present invention;

Fig. 2 is a side elevation of the same;

Fig. 3 is a side elevation of another bait body showing the resistance device in what may be termed the normal position of unstable equilibrium, and indicating in dotted lines two of the numerous variations in position which may be assumed by the resistance device;

Fig. 4 is a front face view of the resistance device in the form shown in Figures 1, 2, and 3.

Fig. 5 is a variation in the formation or configuration of the resistance device; and Fig. 6 is an edge view of the device shown in Fig. 5.

The resistance device of the present invention in the form shown in Figs. 5 and 6, is cylindrically dished to provide forwardly curving side edges 28, but in either form of construction, a channel is provided across the face of the disk for giving direction to the flow and escape of the water current occasioned by the retrieving of the bait.

The resistance element, preferably disk shaped, howsoever constructed, is provided through its body with a hole or aperture 30 which coincides in position with the center of the original circular blank from which it is formed, although it will be understood that the aperture may be decentered or otherwise positioned with corresponding variations in the action produced by the bait when in use.

As shown in Figs. 1, 2 and 3, the resistance element is mounted upon the shank portion of a link 31, which is loosely entered through the aperture 30, and it is desirable that the size of the aperture with relation to the diameter of the link be such as to permit the resistance element to freely adapt itself to different angular planes or to different degrees of obliquity with respect to the link or other portion of the lure upon which it is mounted, but the aperture should not be so large as to permit the resistance element to assume such extreme obliquity that it fails to present adequate surface to the impingement of the water.

The link at its forward end is provided with an eye 32 for the attachment of a line, and its rear end with an eye 33, which is looped through an aperture 34 in the forward end of a spoon 35 carrying a hook 36, which may or may not be covered by feathers 37, buck tail, or other concealment. In lieu of the spoon, the bait body of Fig. 3 may be employed, but in either case it is desirable that sufficient weight and bulk be provided to assist in casting and to ensure that the movements initiated by the resistance element will continue for an appreciable length of time in a given direction, which is requisite to obtain the wide range of darting movements from side to side and the up and down driving movements which characterize the operation of the present invention.

For most purposes it is desirable to employ the link arrangement shown, which increases the liveliness of the lure, but in other cases the shank upon which the resistance device is mounted may be rigid with the bait body, or may constitute a portion of the hook shank itself.

Fig. 3 shows the resistance element standing in a right transverse plane to the shank, upon which it is loosely mounted, and this position may for convenience be termed the normal position of unstable equilibrium, but in action the constant variations in water pressure will cause the resistance element to assume varying degrees of obliquity, two of which are illustrated in dotted lines in Fig. 3, although it will be understood that the looseness and delicacy of the mounting permits of an almost infinite number of variations, both in the angular position and in the rotative relation of the resistance element to the bait body, which, being delicately responsive to minute variations in water pressure, can freely adjust itself into all sorts of positions in response to constantly recurring variations in pressure directed against various portions of the surface presented to the impingement of the water.

It is preferred, however, to so mount the resistance element that when standing in the normal position of unstable equilibrium, it will, on all sides, present a substantial portion of its surface to the impingement of the water, although for most purposes the plane of the surface presented is interrupted by the provision of flanges or other marginal configurations or irregularities extending forwardly of the general plane of the disk.

Nevertheless, in order to obtain the best results, and in order to make the resistance element delicately responsive to variations in water pressure, the aperture 30 should be located at the center of the water resisting area, which includes the surface presented by the flanges or forward curvatures, so that the resistance element will not tend to normally assume a fixed position, but will tend rather to frequently vary its position, both with respect to its obliquity and its rotative adjustment. The formation of the widely extending disk also serves effectually as a weed guard in displacing weeds, snags, or other obstructions in advance of the hook, and by reason of its free mounting it will yield to the pressure of such obstructions and unload them without entanglement.

By reason of its free mounting, the resistance element will be subjected to variable loading and unloading of the water at shifting points, due to slow rotation, which will impart sudden darting movements to the lure, causing it to wiggle and dive or dart or shoot from side to side in an erratic manner, and compounded with these darting movements there will be a constant fluttering or vibratory action, which in greater or less degree will be imparted to the body of the lure, and in addition thereto the drag of the resistance element will cause an erratic swirling action of the water around the forward end of the bait, thereby imparting sinuous swaying or undulatory movements to the lure, and these various movements will be compounded in almost infinite variety.

However, these various fluttering and vibratory motions of the bait above referred to will be compounded with sudden wide darting and diving movements throughout a considerable range, which appear to be due to the configuration of the resistance element and to the provision of what may be termed a water channel, which, at least during short intervals, gives direction to the discharge of impinging water, so that the bait will continue to move in a given line of motion for a sufficient time to provide for the range of movement from side to side and up and down, which is highly desirable in a bait of this general character.

I claim:

1. A fish lure comprising a hook and a resistance member loosely rotatably mounted in advance of the hook and normally presenting its surface in a plane transverse to the line of draft and adapted to be displaced into planes of varying obliquity with respect to its axial mounting, said resistance member having separated marginal portions of its body forwardly extended to afford a water channel across the face of the resistance member to give direction to the discharge of impinging water.

2. A fish lure comprising a hook and a body of size and shape to afford substantial weight and water resistance, to which the hook is secured, and a resistance member loosely rotatably mounted in advance of the body and normally presenting its surface in a plane transverse to the line of draft and adapted to be displaced into planes of varying obliquity with respect to its axial mounting, said resistance member having separated marginal portions of its body forwardly extended to afford a water channel across the face of the resistance member to give direction to the discharge of impinging water.

3. A fish lure comprising a hook and a resistance member loosely rotatably mounted in advance of the hook and normally presenting its surface in a plane transverse to the line of draft and adapted to be displaced into planes of varying obliquity with respect to its axial mounting, said resistance member having separated marginal portions of its body forwardly extended in the form of converging flanges to afford a water channel across the face of the resistance member to give direction to the discharge of impinging water.

4. A fish lure comprising a hook and a body of size and shape to afford substantial weight and water resistance, to which the hook is secured, and a resistance member loosely rotatably mounted in advance of the hook and normally presenting its surface in a plane transverse to the line of draft and adapted to be displaced into planes of varying obliquity with respect to its axial mounting, said resistance member having separated marginal portions of its body forwardly extended in the form of converging flanges to afford a water channel across the face of the resistance member to give direction to the discharge of impinging water.

CHARLES YARVICE.